Patented Apr. 17, 1928.

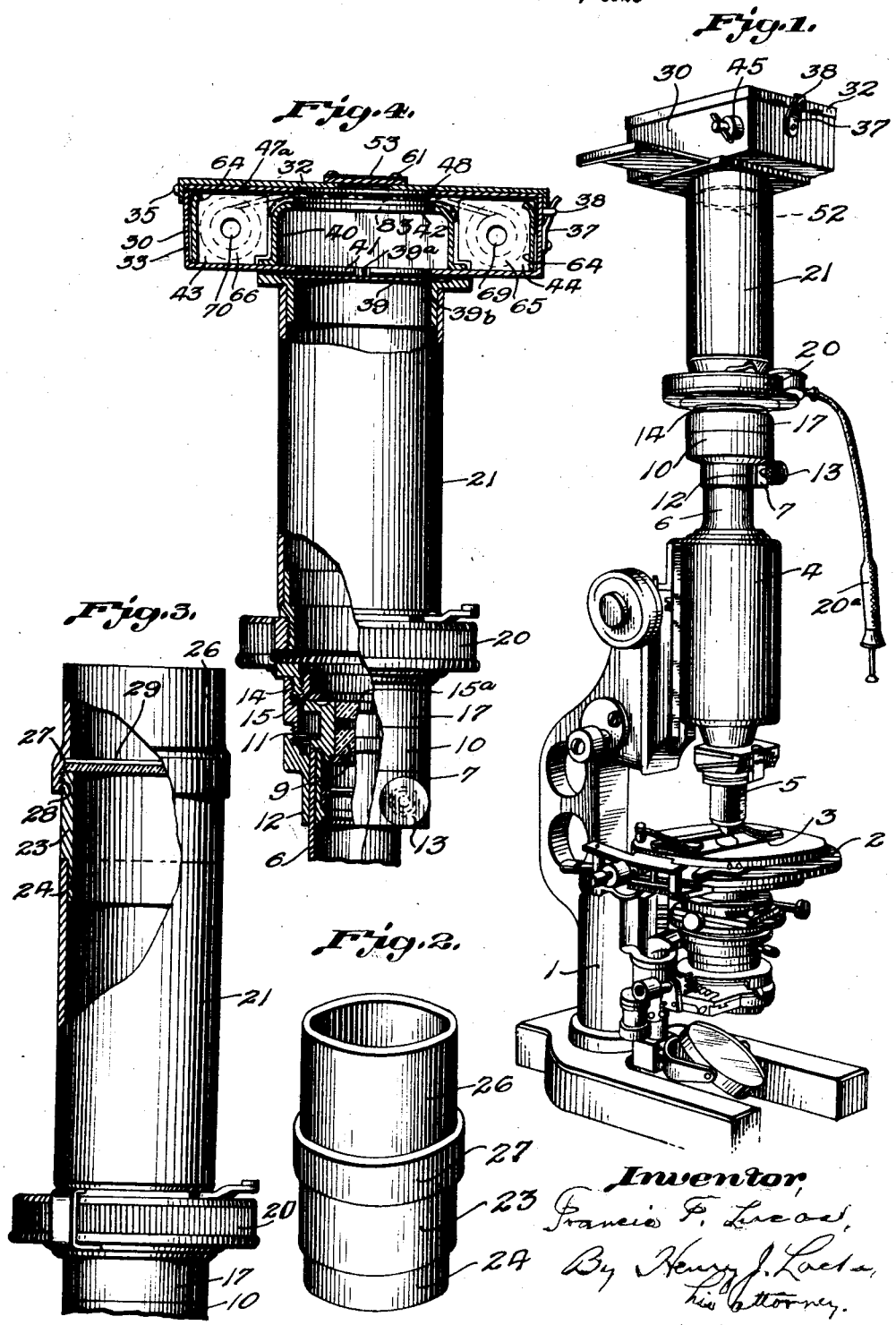

1,666,499

UNITED STATES PATENT OFFICE.

FRANCIS F. LUCAS, OF EAST ORANGE, NEW JERSEY.

PHOTOMICROGRAPHIC CAMERA.

Original application filed November 22, 1921, Serial No. 517,017. Divided and this application filed December 29, 1923. Serial No. 683,289.

This invention relates to an observing and photographic appliance for a photomicrographic camera.

An object of this invention is to provide a photomicrographic camera for attachment to the draw tube of a microscope; consisting of a clamping member; preferably a shutter; an extension tube; a light-tight container capable of holding for exposure a sensitized roll film or interchangeably a sensitized roll film and a sensitized plate, said light-tight container being interchangeable with a ground glass or equivalent screen-containing member fitted with a light shield enabling observation and focusing of the image without the use of a focusing cloth.

A further object of this invention is to provide a photomicrographic camera of simple construction and of light weight so that it may be supported by the draw tubes of common forms of microscopes without causing the focus of the optical system to change after adjustment once has been made.

A further object of the invention is to provide a photomicrographic camera supported by the draw tube of a microscope in such manner that mechanically it becomes an integral part of the microscope and whereby extraneous vibration results in vibrating both the photomicrographic attachment and the microscope as a unit.

A further object of this invention is to provide an observing appliance which may be rigidly attached to the draw tube of a microscope, or to other optical instruments, said appliance to consist of a clamping member; preferably a shutter; an extension tube and a ground glass or equivalent screen containing member fitted with a light shield such that a projected image from the microscope, or equivalent, may be viewed by one or more persons in a normal and natural manner and without the aid of a focusing cloth. Such arrangement enables the microscope and observing appliance to be assembled and to be used in a room having about the usual or average intensity of illumination.

A further feature of this invention is to provide a photomicrographic camera capable of rigid attachment to the draw tubes of common forms of microscopes such that the longitudinal arrangement of the parts become definitely fixed thus enabling successively focused objects to be photographed on a sensitized roll film or a sensitized plate under definitely comparable conditions without adjustment of the parts of the camera proper. Said objects may be photographed at the same setting of the microscope and photomicrographic camera or at intervals of time as desired, notwithstanding that the microscope and photomicrographic camera may have been dismanteled in the meantime and later reassembled.

Further features and objects of the invention will be more fully understood from the following detail description and the accompanying drawings, in which Fig. 1 is a front perspective view of a microscope provided with my invention, the parts being shown at the stage of taking the exposure;

Fig. 2 is a front perspective elevation of the mounting tubes for the focusing ground glass; and Figs. 3 and 4 are comparative front elevations respectively of the focusing ground glass mounted on the shutter tube and of the container mounted on the shutter tubes; Fig. 3 is broken away to show the assembly of the ground glass disk and the parts of its tubes, whereas Fig. 4 is broken away in central vertical elevation through the light-tight container and also through the shutter and through the parts for supporting and attaching my improved photomicrographic device to the microscope proper.

Referring to Fig. 1, I have illustrated an approved type of microscope 1, including the adjustable stage 2 on which the specimen 3 to be photographed is supported, and further comprising the body tube 4, provided with suitable means for attachment of the objective 5 and the draw tube 6 telescoping with the body tube 4.

Pursuant to my invention, I provide, as appears in assembly in Figs. 1 and 4, a clamping ring 7 to be received on the terminal portion of the draw tube 6, and in which ring 7 is placed the simple eye-piece or a compensating eye-piece 9, as is indicated in Fig. 4. Such clamping ring 7 comprises the annular portion 10 which is internally threaded at 11, see Fig. 4, and also radially slitted extension 12 having the clamping screw 13.

When a simple eye-piece is employed, the external threading of the short lower tube 14 of the shutter, is brought into mesh with the internal threading 11 of the clamping ring 10 and I provide the positioning ring 15, see Fig. 4, for engagement directly with the metal casing of the eye-piece 8. Such positioning ring 15 is externally threaded to mesh with the internal threading of the lower tube length 14 of the shutter, and is flanged at 16 to extend laterally to abut the lower edge shutter tube 14.

Accordingly, upon placing the eye-piece 8 within the ring 10 and thereupon securing the lower tube length 14 of the shutter within the ring 10 until the ring 10 abuts tightly against the shutter 20 as shown at 11$^a$, the ring 10 with the shutter 20 attached thereto and enclosing the eye-piece 8, is located on and enclosing the eye-piece 8, is located on the draw tube 6 by allowing the clamping ring, 12, to slide downwardly on the draw tube, 6, of the microscope, until the head of the microscope draw tube 6 abuts the flanged extension of the casing of the eye-piece, and until the positioning ring 15, rests upon the top of the eye-piece in the position clearly shown at 15$^a$, whereupon the clamping screw, 13, of the clamping ring 10, is tightened. This adjustment of the parts insures that the eye-piece assumes its normal position with reference to the microscope draw tube 6 and it also insures that my improved observing or photographic appliance will assume a definite and exact position longitudinally with reference to a given combination of parts such as the draw tube, 6, and eye-piece. Moreover, it will be clearly seen that the parts may be dismantled and reassembled whereupon the same exact longitudinal arrangement of the parts will result.

While I have shown the use of an eye-piece, the eye-piece may be omitted if desired whereupon the positioning ring, 15, comes to rest upon the head of the microscope draw tube, 6, instead of upon the top of the eye-piece as shown at 15$^a$.

When it is desired to use certain forms of eye-pieces such that the upper lens of the eye-piece is designed to protect materially above the head of the microscope draw tube, a type of which is indicated at 9, a compensating ring 17 of suitable dimensions is employed, as is indicated in Fig. 4, such compensating ring 17 being internally threaded at its upper portion to mesh with the external threading of the tube length 14 of the shutter; the ring 17 is externally threaded to mesh with the internal threading 11 of the clamping ring 10.

It will be understood that all various types of eye-pieces for microscopes may be employed if desired and the compensating ring selected of an effective length corresponding to the extent of projection of the eye-piece above the end of the draw tube of the microscope.

The shutter indicated at 20 is of any approved type and may be provided with a short upper tube 21, as is indicated in Fig. 1 and enlarged in Figs. 3 and 4, or may be provided with the long upper tube 22. Usually such short length tube 21 for commercial forms of microscopes and with a commonly used type of shutter, is of the length of three inches and the long tube 22 with a commonly used type of shutter, is of the length of eight inches, providing respectively for magnification in the proportion of one to two, the images respectively being formed at distances of five and ten inches from the eye-piece. The absolute magnification, as will be understood by those skilled in the art, is determined by the optical constants of the microscope.

In carrying out my invention, I prefer the use of a focusing ground glass and mounting tube therefor, as is indicated in external appearance in Fig. 2. Such ground glass unit comprises the lower tube section 23 having the lowermost end portion 24 reduced to be received within the tube length 21 (or 22) of the shutter and to be held thereon. The ground glass disk 25 is suitably held between the lower tube section 23 and the upper tube section 26, as by providing the expanded annular portion 27, recessed annularly inwardly to receive the ground glass disk 25 and provided at its lower end with the threading 28 meshing with the threading 29 at the upper end of the lower tube section 23.

The effective upward extension of the tube length 26 is such that the image displayed on the ground glass 25 is not naturally affected by indirect sunlight or by light from any other external source entering the tube length 26 I have found that a tube-length of about one and one-half inches for ordinary types of microscopes, has given excellent results. Such arrangement provides for viewing the image and for focusing without the use of a focusing cloth. The arrangement has also the advantage of allowing the observer to use both eyes in the natural manner and in normal position. Furthermore, the arrangement has the particular advantage of allowing any number of persons to view the image at the same time, so that details of structure or other characteristics of the specimen under examination may be clearly seen by a number of persons at the same time. In Fig. 3 I have indicated the ground glass and its associated tube lengths mounted on the shutter tube which in turn is mounted on the microscope, as is more fully indicated in Fig. 1, in which instance the image of the specimen 3 is readily and definitely viewed with both eyes of the observer or may be viewed by two or more persons at the same time. It will be understood that the shutter in such circumstance has been moved to its open position.

After the proper image has been had by observation through the ground glass 25, the container 30, loaded either with a sensitized film or a plate, is then positioned in replacement of the ground glass 25 and its mounting tubes 23, 26, firstly by closing the shutter, and removing the ground glass unit and then placing the container 30 on the end of the shutter tube 21 (or 22), and thereafter opening (as shown in Fig. 1) the slides 39 of the container 30.

The shutter 19 is then operated by means of its release 20ª, see Fig. 1, and the exposure thus carried out. The slide 39 is then closed, and the film wound forward for the next exposure. In the event that the exposure is made on a sensitized plate, the container is taken into a dark-room or equivalent, for removal of the exposed plate and reloading of a fresh plate.

This application is a division of my original application Serial No. 517,017, filed by me on November 22nd, 1921, now matured as U. S. Patent No. 1,537,539, dated May 12th, 1925, wherein is described and claimed the holder for the sensitized film or plate and the associated parts to provide for the self-positioning of the sensitized medium, for holding the portion of the film taut and associated parts. My copending application Serial No. 683,290, also a division of my aforesaid original application Serial No. 517,017, is directed to the method of photography, set forth in my aforesaid original application.

Whereas I have described my invention by reference to specific forms thereof it will be understood that many changes and modifications may be made without departing from the spirit of the invention.

I claim:

1. In a photographic device, a uniplanar element of ground glass, means for arranging said ground glass element in light-tight relation with a suitable optical image-forming device and means for excluding light foreign to the rays forming the image, said excluding means including a tube extending from said ground glass element toward the observer permanently secured to said ground glass element.

2. In a photographic device, a uniplanar element of ground glass, means disposed anteriorly of said ground glass element for arranging said ground glass element in light-tight relation with a suitable optical image-forming device and means disposed posteriorly of said ground glass element for excluding light foreign to the rays forming the image, said excluding means including a hollow member permanently secured to said ground glass element, said hollow member being open at the end adjacent the position of observation by the observer.

3. In a photographic device, a uniplanar element of ground glass, means for arranging said ground glass element in light-tight relation with a suitable optical image-forming device, said means comprising a tube having its end adjacent the position of said ground glass element provided with threading, and tubular means disposed posteriorly of said ground glass element for excluding light foreign to the rays forming the image, said tubular means having threading at its one end meshing with the aforesaid threading, the opposite end of said tubular means being open.

4. In a photographic device including tubular means for receiving at its one end in a holder for a sensitized medium, unitary means for disposing a ground glass element in light-tight relation with said tubular means and for excluding light foreign to the rays forming the image, said unitary means comprising a tube arranged at its one end to engage said one end of said tubular means and further comprising a tubular element extending in a direction from said ground glass element opposite from said tubular means, the free ends of said tubular element being open.

5. In a photographic device including tubular means for receiving at its one end in a holder for a sensitized medium, unitary means for disposing a ground glass element in light-tight relation with said tubular means and for excluding light foreign to the rays forming the image, said unitary means comprising a tube having its one end in telescoping relation with said one end of said tubular means and further comprising a tubular element extending in a direction from said ground glass element opposite from said tubular means, the free ends of said tubular element being open.

In testimony whereof I have signed this specification this 18th day of December, 1923.

FRANCIS F. LUCAS.